United States Patent Office

3,580,861
Patented May 25, 1971

---

3,580,861
METHOD OF PREPARING RARE-EARTH METAL ORTHOVANADATE PHOSPHORS BY PRECIPITATION
Richard C. Ropp, Warren, N.J., assignor to Westinghouse Electric Corporation, Pittsburgh, Pa.
No Drawing. Filed Mar. 18, 1969, Ser. No. 808,320
Int. Cl. C09k 1/44
U.S. Cl. 252—301.4R
13 Claims

ABSTRACT OF THE DISCLOSURE

An improved method of precipitating rare-earth metal orthovanadate phosphor from aqueous solution. The constituents are dissolved in acid solution, with vanadium pentoxide being dissolved in hydrochloric acid to provide a high concentration of vanadyl radical in solution. Predetermined amounts of ammonium hydroxide and hydrogen peroxide are admixed with the rare-earth metal and vanadium containing acid solutions so that the pH of the resulting mixture is determined to provide a condition under which rare-earth metal orthovanadate is very efficiently precipitated. The precipitant is calcined to provide an activated, efficient rare-earth metal orthovanadate phosphor.

BACKGROUND OF THE INVENTION

Rare-earth metal orthovanadate phosphors, particularly europium-activated yttrium orthovanadate, are luminescent materials having wide application ranging from use as one component of color television screens, to acting as a color correcting phosphor for high pressure mercury vapor lamps. The vanadate phosphors in general have a broad excitation characteristic which accounts for their divergent usage.

In general, orthovanadates have been prepared as is standard for most luminescent compositions, by calcining a mixture of the metallic oxides. Recently precipitation techniques have been applied to the preparation of luminescent materials, including the rare-earth metal orthovanadates. In general, in the prior art precipitation technique, as set forth in Dutch patent application No. 6,612,195, the rare-earth metal constituent was dissolved in acid solution and admixed with an aqueous vanadium containing solution, prepared by dissolving one of the more readily soluble vanadium compounds in water. A sufficient amount of a base material is then added to raise the pH of the resulting mixture to render it basic and precipitate out a vanadate complex which included the orthovanadate. This prior art technique has inherent difficulties in adapting it to commercial production. The water soluble vanadium compounds are only limitedly soluble and the vanadium ion molar concentration in solution is thus limited, which fact impairs the efficiency of the precipitation. Further, the precipitant obtained by this method typically includes various vanadate complexes in addition to the orthovanadate, and this requires that vanadium containing flux be added during a firing process to assure that the phosphor formed is activated rare-earth metal orthovanadate.

Hydrogen peroxide has been used in the prior art in the precipitation of rare-earth metal oxides.

SUMMARY OF THE INVENTION

It is therefore an object of the present invention to provide a method of preparing superior rare-earth metal orthovanadate phosphors.

It is a further object of the invention to provide a method which makes the production of rare-earth metal orthovanadate phosphors more economical by being a more efficient mode of preparation.

It is another object to provide a method which achieves very uniform particle size control of the prepared rare-earth metal orthovanadate.

It is yet another object of providing a method whereby rare-earth metal orthovanadate can be precipitated from aqueous solution as substantially only orthovanadate composition, thereby eliminating any need to remove or adjust for other vanadium complexes prior to firing to render the material luminescent.

It is still another object to prepare rare-earth metal orthovanadate by a method which produces a superior luminescent material having a white body color material.

It is also an object to provide a method of preparing europium-activated yttrium or lanthanum orthovanadate phosphor in an efficient manner, and which phosphors exhibit a superior red-emission characteristic under a broad range of excitation wavelengths.

These objects and others which will become apparent as the description proceeds are achieved by the method which comprises dissolving a predetermined amount of vanadium pentoxide in a concentrated solution of hydrochloric acid to provide a vanadyl radical containing acid solution. An amount of rare-earth metal ion containing solution, and ammonium hydroxide and hydrogen peroxide are admixed thereto. The ratio of vanadyl radical to rare-earth metal ion in the resulting mixture is about 1:1, with the amount of ammonium hydroxide being sufficient to raise the pH of the resulting mixture to a value greater than 7. The mixture is maintained at a predetermined temperature whereby a precipitant consisting essentially of $LnVO_4$ and $NH_4Cl$ is formed. The precipitant is readily separated by filtration from the solution, and the $LnVO_4$ is separated from the $NH_4Cl$, preferably during a firing activation process which renders the rare-earth metal orthovanadate composition a very bright luminescent material.

DESCRIPTION OF THE PREFERRED EMBODIMENT

Solution A

A 1.05 molar concentration solution of vanadyl radical $VO^{+2}$ containing solution is prepared by dissolving 0.525 mole of $V_2O_5$ (95.5 grams), in one liter of concentrated HCl (30% by weight HCl).

Solution B

A one molar concentration solution of $Ln^{+3}$ is prepared by dissolving 0.465 mole of $Y_2O_3$ (105 grams) and 0.035 mole of $Eu_2O_3$ (12.28 grams) in 550 milliliters of concentrated HCl (30% by weight HCl), and distilled water is added to bring the solution volume to 1 liter.

Solution C

A mixture of $NH_4OH$ and $H_2O_2$ is prepared by mixing 390 liters of $NH_4OH$ solution which is 30% by weight $NH_4OH$, and 130 liters of $H_2O_2$ solution which is 30% by weight $H_2O_2$.

In practicing the method of the present invention place about 130 liters of Solution A in a glass lined reaction tank and dilute with 130 liters of deionized water. Add to the reaction tank 130 liters of Solution B and 130 liters of deionized water stirring continuously and heating to about 70° C. Add Solution C at a steady rate so that the pH of the resulting mixture is increasing at a fairly constant rate of change. Solution C is preferably added at about 3 liters/minute, in the example above, until the pH is about 8. The resulting mixture is stirred and heated to about 80° C. for about 45 minutes during which time the precipitate forms. After allowing the solution to cool and the precipitate to settle, the precipitant is filtered and substantially separated from the aqueous mother liqour.

The dried precipitate is then loaded into trays with a large exposed surface area, and fired in air for about 6 hours at 1200° C. The precipitate is substantially all (YEu)VO$_4$ and NH$_4$Cl, which upon firing produces the orthovanadate composition expressed as YVO$_4$:Eu. It is important to provide a large surface area when firing the precipitate because the orthovanadate can be reduced by the NH$_4$Cl present to metavanadate which has a black body color, and is generally undesirable. After the fired material cools it is ready for use as a color correcting phosphor for high pressure mercury vapor devices, or as the red component phosphor for preparing a television screen.

In the foregoing example, the yttrium can be substituted for in whole or in part by lanthanum and/or gadolinium, and the europium can be substituted for in whole or in part by the other lanthanide series rare-earth metals. The lanthanide series rare-earth metals substituted for the europium should be present in an activating proportion.

The foregoing description of the method of the preferred embodiment of practicing the invention teaches the addition of the rare-earth metal acid solution to the vanadate ion-containing acid solution, followed by the simultaneous addition of the NH$_4$OH+H$_2$O$_2$ solution at a fairly constant rate. This particular ordered addition of reactants has been observed to result in the best output luminescent composition after firing. The yield is also substantially higher than prior art precipitation techniques.

In general, with respect to the ordered addition of the respective constituents, i.e., the rare-earth metal containing acid solution, the vanadyl radical containing acid solution, the ammonium hydroxide, and the hydrogen peroxide, the preferred mode of addition is to add the rare-earth metal containing acid solution to the vanadyl radical containing acid solution, and then to simultaneously add the ammonium hydroxide and the hydrogen peroxide solutions thereto at a rate much as to change the pH of the resulting mixture at a fairly constant rate. The method produces a very high precipitant yield, typically greater than 95% of the theoretical, and high phosphor brightness. The ammonium hydroxide and hydrogen peroxide can be admixed with the vanadyl radical containing solution, and this mixture added to the rare-earth metal containing acid solution, and also the ammonium hydroxide and hydrogen peroxide can be admixed with the rare-earth metal containing acid solution and this mixture admixed with the vanadyl radical containing solution. Furthermore, it is preferred but not essential that the ammonium hydroxide solution and the hydrogen peroxide solution be simultaneously admixed.

It has been discovered that in order to achieve this high yield of orthovanadate precipitate that the vanadium must be present in relatively high concentration which is here achieved by dissolving V$_2$O$_5$ in concentrated hydrochloric acid solution, thereby providing a relatively high vanadyl radical concentration in solution. Other prior art techniques of precipitation of the orthovanadate started with the vanadate radical, VO$_4^{-3}$, in solution, this vanadate ion being an anion which reacts with the rare-earth cation to form the vanadate precipitate. Unexpectedly applicant has found that to achieve high yield it is necessary to start with the vanadium in solution as a cation, i.e., the vanadyl radical VO$^{+2}$. Applicant has discovered that the vanadyl cation in solution can be converted to an anion by the addition of the NH$_4$OH$_4$ and the H$_2$O$_2$. It is even more surprising that the H$_2$O$_2$ is preferably added simultaneously with the NH$_4$OH to the combined acid solution containing the rare-earth metal cation and the vanadyl cation to cause the precipitate to form. While H$_2$O$_2$ is known to act as a reducing agent in acidic solutions, here the H$_2$O$_2$ is preferably added while the solutions are still acidic, since it is added simultaneously with the basic solution, and yet the vanadyl radical is converted to the anion VO$_4^{-3}$ which forms the precipitate with the rare-earth metal cation at a pH greater than about 7.

At a pH of about 7 up to 7.5 the precipitant includes rare-earth metal orthovanadate, ammonium chloride, and rare-earth metal metavanadate complexes. When this precipitant is fired the resulting products are LnVO$_4$ and V$_2$O$_5$, and the V$_2$O$_5$ can be separated from the activated LnVO$_4$ phosphor by a basic wash typically ammonia, sodium hydroxide or other such strong bases. When sufficient NH$_4$OH is admixed as in the foregoing specific example to raise the pH of the resulting solution to a value greater than 7.5, and preferably about 8, the resulting precipitant substantially comprises only rare-earth metal orthovanadate and ammonium chloride. The precipitant is filtered from the solution and fired to provide the activated LnVO$_4$ luminescent composition.

It has been discovered that in order to obtain high yield percentages from a precipitation method of preparing orthovanadate, that the vanadyl radical VO$^{++}$ should be present in a concentration of from 0.2 to 2.5 molar. The vanadyl radical concentration can be readily produced by dissolving V$_2$O$_5$ in HCl, with the HCl concentration being at least 9.5 molar in order to dissolve upwards of 80% of the V$_2$O$_5$. The dissolution of V$_2$O$_5$ in HCl results in chlorine gas as a byproduct and precaution should be taken. While the vanadyl radical concentration can be made to be about 2.5 molar by dissolving V$_2$O$_5$ in concentrated HCl, it is preferable to practice the present method utilizing about a one molar concentration of vanadyl radical in solution. This is because the addition of the ammonium hydroxide to the vanadyl radical and rare-earth metal solutions results in the formation of a vanadate complex which depolymerizes slowly as defined in Equation 1.

(1) 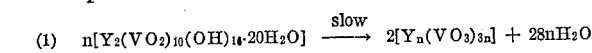 $n[Y_2(VO_2)_{10}(OH)_{14} \cdot 20H_2O] \xrightarrow{slow} 2[Y_n(VO_3)_{3n}] + 28nH_2O$ This process of depolymerization proceeds at a rate largely dependent on the vanadyl radical concentration and to insure a practical production time for the orthovanadate the vanadyl radical concentration is preferably about one molar.

The hydrogen peroxide serves a two fold purpose as can be seen by reference to Equations 2 and 3:

(2) 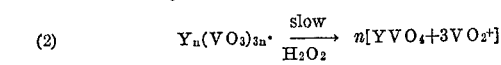 $Y_n(VO_3)_{3n} \xrightarrow[H_2O_2]{slow} n[YVO_4 + 3VO_2^+]$ (3) 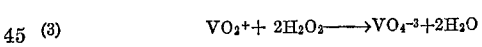 $VO_2^+ + 2H_2O_2 \longrightarrow VO_4^{-3} + 2H_2O$ The hydrogen peroxide thus is seen to aid the conversion of the vanadium complex, which results from depolymerization as explained by Equation 1, to the orthovanadate and pervanadyl radical, and to also convert the pervanadyl radical (VO$_2^+$) to the orthovanadate radical as explained by Equation 3.

The resulting LnVO$_4$ luminescent composition which is produced by firing the precipitant has an off-white body color, with a particle size of about one-half micron. The composition has a broad excitation characteristic, extending from about 2000–3650 A. The emission of, for example, the YVO$_4$:Eu or LaVO$_4$:Eu composition exhibit a very saturated red output which is desirable for color television screens as well as for color correcting mercury vapor discharge devices. The luminous output actually doubles in going from room temperature operation to 300° C. under HPMV excitation.

What is claimed is:

1. Method of efficiently precipitating LnLn'VO$_4$ composition, wherein Ln is at least one rare-earth metal of the group lanthanum, yttrium and gadolinium, and Ln' is at least one selected lanthanide rare-earth metal different from Ln and present in phosphor activating proportion, which method comprises:

(a) dissolving a predetermined amount of vanadium pentoxide in a concentrated solution of hydrochloric acid to provide a vanadyl radical containing acid solution;

(b) admixing with said vanadyl radical containing acid solution predetermined amounts of said Ln and Ln' rare-earth metal in the form of metal ion containing acid solution, ammonium hydroxide, and hydrogen peroxide, with the ratio of vanadyl radical to rare-earth metal ions in the admixed solution being about 1:1, said amount of ammonium hydroxide being sufficient to raise the pH of the resulting mixture to a value of at least greater than 7 with the rate of addition of said ammonium hydroxide being such to change the pH of the resulting mixture at a fairly constant rate of change of pH, and with the resulting mixed solution being maintained at a predetermined temperature whereby rare-earth metal vanadate is precipitated;

(c) separating said precipitant from said solution, and said $LnLn'VO_4$ from said precipitant.

2. The method as specified in claim 1, wherein Ln' is europium.

3. The method as specified in claim 1, wherein said amount of ammonium hydroxide added is sufficient to raise the pH of the resulting solution to greater than 7.5, whereby said precipitant substantially comprises $LnLn'VO_4$ and $NH_4Cl$.

4. The method as specified in claim 1, wherein said hydrochloric acid solution concentration is at least about 9.5 molar.

5. The method as specified in claim 1, wherein said vanadyl ion concentration in said acid solution is preferably from 0.05 to 2.5 molar.

6. The method as specified in claim 1, wherein said ratio of vanadyl ions in solution to rare-earth metal ions in solution is preferably 1.05:1.

7. The method as specified in claim 1, wherein the admixing of the constituents is preferably carried out by adding said rare-earth metal acid solution to said vanadyl ion containing acid solution, and then simultaneously adding thereto said ammonium hydroxide and said hydrogen peroxide.

8. The method as specified in claim 1, wherein the amount of ammonium hydroxide is adjusted to provide a final pH of the resulting solution of about 8.

9. The method as specified in claim 1, wherein the weight ratio of ammonium hydroxide to hydrogen peroxide admixed to said acid solutions is about 3:1.

10. Method of preparing luminescent composition expressible by the formulation $LnVO_4:Ln'$, which method comprises the method as specified in claim 1, wherein said precipitant, which includes a proportion of $NH_4Cl$, is fired at from 900° C. to 1400° C. for at least one hour; with the higher the firing temperature the shorter the firing time.

11. The method as specified in claim 10, wherein said firing is preferably at 1200° C. for about six hours.

12. The method as specified in claim 10, wherein said firing is conducted in an atmosphere comprising oxygen with said precipitant having a large exposed surface area which is freely ventilated to remove the volatilized components of said $NH_4Cl$ present in said precipitant.

13. Method of efficiently precipitating $LnLn'VO_4$ composition, wherein Ln is at least one rare-earth metal of the group lanthanum, yttrium, and gadolinium, and Ln' is at least one selected lanthanide rare-earth metal different from Ln and present in phosphor activating proportion, which method comprises:

(a) dissolving a predetermined amount of vanadium pentoxide in a concentrated solution of hydrochloric acid to provide a vanadyl radical containing acid solution;

(b) adding to said vanadyl radical containing acid solution predetermined amounts of said Ln and Ln' rare-earth metal in the form of metal ion containing acid solution, with the ratio of vanadyl radical to said rare-earth metal ions in said solution being about 1:1;

(c) adding to said admixed solution a mixture of ammonium hydroxide and hydrogen peroxide at a fairly constant rate to change the pH of the resulting mixture to a value of at least greater than 7, and maintaining the resulting mixture at a predetermined temperature and for a predetermined time to precipitate rare-earth metal vanadate; and (d) separating said precipitant from said solution, and said $LnLn'VO_4$ from said precipitant.

References Cited

UNITED STATES PATENTS 3,360,480   12/1967   Martin, Jr. et al. ____ 250—301.4

ROBERT D. EDMONDS, Primary Examiner